June 19, 1962 L. P. GAJDA 3,039,329
DRILL PRESS
Filed April 18, 1960
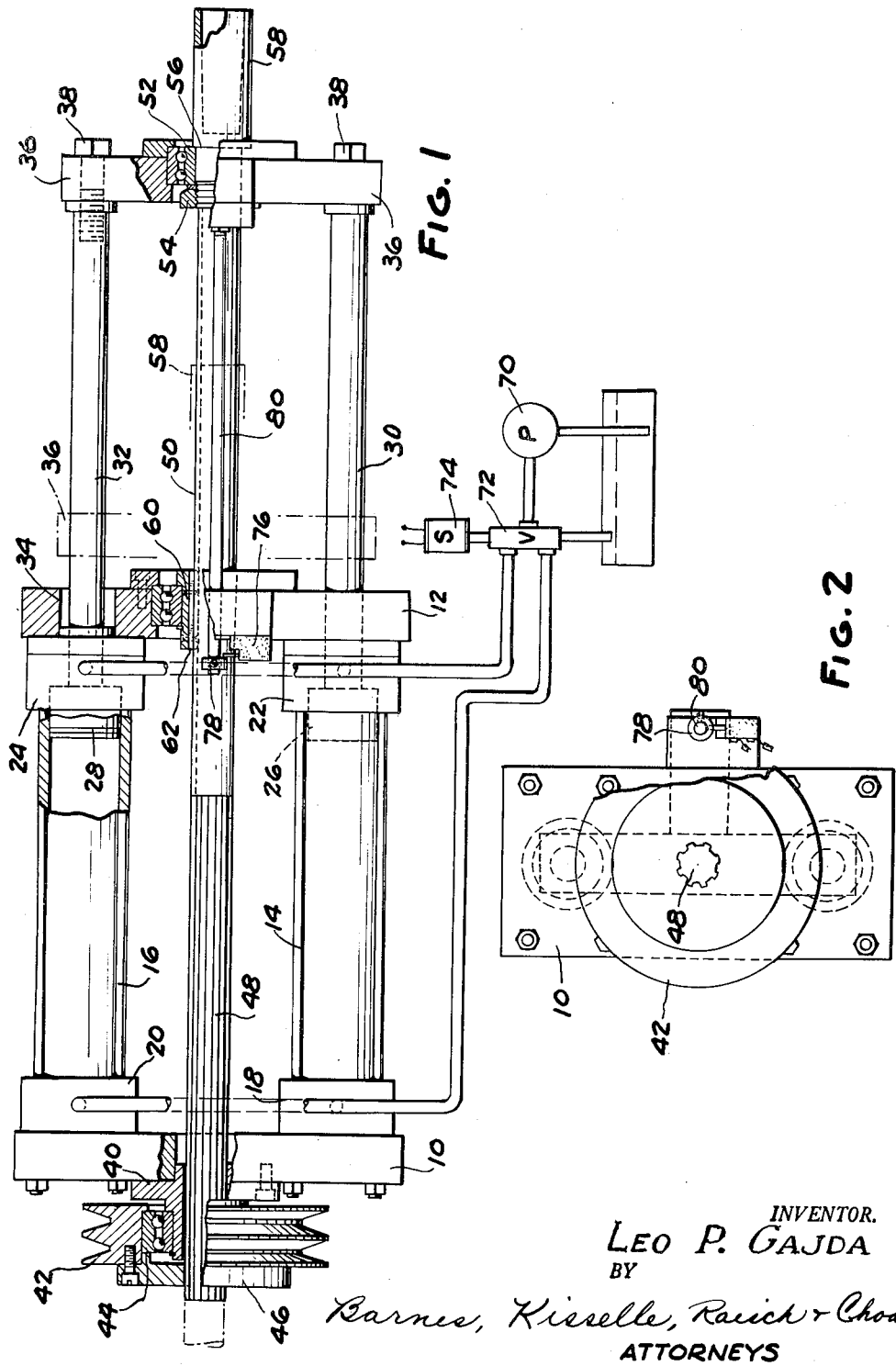
INVENTOR.
LEO P. GAJDA
BY
Barnes, Kisselle, Raisch & Choate
ATTORNEYS

# United States Patent Office 3,039,329
Patented June 19, 1962

1

3,039,329
DRILL PRESS
Leo P. Gajda, Detroit, Mich., assignor to Snyder Corporation, Detroit, Mich., a corporation of Michigan
Filed Apr. 18, 1960, Ser. No. 22,935
3 Claims. (Cl. 77—33.5)

This invention relates to a drilling device and has particularly to do with a drill head which is to be mounted on an automatic machine, for example, in a position where a drill spindle can be projected forward and back, to and from a working position by a pneumatic or hydraulic means.

It is an object of the invention to provide an inexpensive and simple drill spindle which is readily constructed from available parts and which requires no expensive sheathing or mounting means for the drilling spindle itself.

In all known constructions of this kind, the drilling spindle is mounted in a quill which is then mounted for projection to and from a drilling position.

The present device may be characterized as a quill-less drill spindle so arranged that the drill spindle itself projects without a quill mounting.

Other objects and features of the invention relating to details of construction and operation will be apparent in the following description and claims.

Drawings accompany the disclosure and the various views thereof may be briefly described as:

FIGURE 1, an assembly view showing the relationship of the parts.

FIGURE 2, an end view of the structure taken from the left end of the device as shown in FIGURE 1.

Referring to the drawings:

The basic mount for the device on a machine comprises two plates 10 and 12, which serve as mounting plates for two fluid cylinders 14 and 16, having heads 18 and 20 and a base end 22 and 24. Within the cylinders are pistons 26 and 28, each of which has fastened thereto a rod 30 and 32, passing through holes 34 in plate 12. The ends of the piston rods 30 and 32 are connected by a cross plate 36, which is bolted securely to the ends of the rods by bolts 38.

The cylinder assemblies 14 and 16, together with heads and base ends, form a rigid frame with the plates 10 and 12, these parts being secured together by bolts and nuts or by welding, the cylinders being demountable for replacement of wear parts. Each of the plates 10, 12 and 36 are apertured centrally between the pistons and the piston rods. The aperture of the plate 10 contains a bearing collar 40 on which is mounted a pulley drive wheel 42 with a suitable ball bearing assembly 44 interposed between the collar 40 and wheel 42.

Capping the wheel 42 is a disc 46 which can be referred to as a drive disc, it being splined to receive the splined end 48 of a drill spindle 50, the splined end 48 being slidable in the disc 46. The spindle 50 is mounted at the drill end in plate 36 in a bearing assembly 52 and locked against the inner race by a screw collar 54, the race bearing at the other side against a shoulder 56 on a

2 drill socket 58. The shaft 50 is also slidably mounted within the plate 12 in a collar 60 which is keyed to the shaft by a key 62. The collar is affixed to the inner race of a bearing assembly 64 in plate 12.

It will be seen that the drill spindle 50 can be rotated at any proper speed by the use of a belt drive to the pulley 42 and at the same time the spindle can be driven forward and backward in the supporting frame by fluid in the respective ends of the cylinders 14 and 16. This can be accomplished by a pump 70 feeding hydraulic pressure to a valve 72 controlled by a solenoid 74.

The solenoid can be controlled by limit switches, such as the switch 76, controlled by a collar 78 on a rod 80, moving with the frame member 36 and slidable in a bracket on frame member 12.

It will be seen that the simple structure above described can be utilized on automation machines where a plurality of drilling heads are required, which must be fluid operated and power driven. The arrangements are such that the heads can be spaced closely together and the actuating spindle is a simple rod which slides back and forth in the frame created by the piston and cylinder assembly. The fluid actuation permits individual timed control of each spindle. The splined spindle which slides relative to the rotary drive simplifies the power mechanism and will permit a number of spindles to be driven by a single power source.

I claim:

1. A drilling assembly comprising, a first mounting plate and a second mounting plate, a plurality of cylinders, each having a closed head and a closed base, means securing the bases of said cylinders to said first plate and means securing the heads thereof to said second plate, said cylinders and plates cooperating to form a substantially rigid frame with said cylinders serving as spacers to secure said plates in spaced apart relation for mounting on spaced parts of a machine, said plates having aligned openings through which a rotating and sliding drilling spindle projects, means adjacent the side of said first plate opposite from said second plate for driving said spindle in a rotary motion, pistons in said cylinders having piston rods projecting through openings in said second plate for operable connection to a crosshead, and means forming a rotational but longitudinal drive connection between said crosshead and spindle.

2. The combination defined in claim 1 wherein said cylinders and plate form a substantially rectangular frame.

3. The combination defined in claim 1 wherein said spindle comprises a solid rod having such a length that in extended condition of said piston rods relative to said cylinders, said rod extends from said rotary drive therefor to said crosshead.

References Cited in the file of this patent
UNITED STATES PATENTS 2,550,148   Harding _____ Apr. 24, 1951
2,863,339   Emrick _____ Dec. 9, 1958